United States Patent [19]

Gentili

[11] Patent Number: 5,101,982
[45] Date of Patent: Apr. 7, 1992

[54] CONVEYING AND OFF-LOADING APPARATUS FOR MACHINES FOR THE AUTOMATIC SELECTION OF AGRICULTURAL PRODUCTS SUCH AS FRUIT

[75] Inventor: Luciano Gentili, Cesena, Italy

[73] Assignee: Decco Roda S.p.A., Bertinoro, Italy

[21] Appl. No.: 135,817

[22] Filed: Dec. 21, 1987

[30] Foreign Application Priority Data

Dec. 24, 1986 [IT] Italy .................................. 3623 A/86
Dec. 24, 1986 [IT] Italy .................................. 3624 A/86

[51] Int. Cl.⁵ .............................. B07C 5/18; B07C 5/08
[52] U.S. Cl. .................................. 209/556; 209/592; 209/698; 209/701; 198/779; 198/502.1; 177/145
[58] Field of Search ............... 209/556, 558, 592, 593, 209/594, 595, 596, 701, 698, 912; 198/365, 504, 505, 779; 177/52, 54, 145, 55, 56, 57, 199, 253, 256, 261, 262, 263

[56] References Cited

U.S. PATENT DOCUMENTS

| | | | |
|---|---|---|---|
| 1,026,385 | 5/1912 | Dull | 198/706 |
| 2,471,711 | 5/1949 | Altenpohl | 209/648 |
| 3,088,576 | 5/1963 | Mumma . | |
| 3,100,571 | 8/1963 | Reck et al. | 209/938 X |
| 3,167,192 | 1/1965 | Harrison . | |
| 3,233,720 | 2/1966 | Altanassoff et al. | 198/365 |
| 3,255,660 | 6/1966 | Hirt | 209/698 X |
| 3,275,135 | 9/1966 | Niese | 209/698 X |
| 3,348,678 | 10/1967 | Flowers | 209/595 |
| 3,360,106 | 12/1967 | Harrison et al. | 198/365 |
| 3,460,668 | 8/1969 | Gerrons | 198/779 X |
| 3,489,278 | 1/1970 | Alexander | 209/593 |
| 3,510,014 | 5/1970 | Speaker et al. | 198/365 X |
| 3,545,614 | 12/1970 | Sheetz | 209/646 |
| 3,557,951 | 1/1971 | Knisch | 209/513 |
| 3,589,501 | 6/1971 | Harrison | 198/365 |
| 3,630,394 | 12/1971 | Kingzett | 198/365 X |
| 3,637,066 | 1/1972 | Idskov | 198/365 X |
| 3,643,798 | 2/1972 | Krupotich | 209/593 |
| 3,662,874 | 5/1972 | Muller | 198/365 |
| 3,669,245 | 6/1972 | Wooten et al. | 198/365 |
| 3,750,879 | 8/1973 | Luckett et al. | 198/365 |
| 3,881,609 | 5/1975 | Ellis et al. | 198/365 X |
| 3,930,995 | 1/1976 | Paddock | 209/74 |
| 3,944,056 | 3/1976 | Feehery | 198/706 |
| 3,974,909 | 8/1976 | Johnson | 198/365 |
| 4,031,998 | 3/1976 | Suzuki et al. | 198/365 |
| 4,089,404 | 5/1978 | Venzke | 198/365 |

(List continued on next page.)

FOREIGN PATENT DOCUMENTS

| | | | |
|---|---|---|---|
| 0060013 | 9/1982 | European Pat. Off. | 209/592 |
| 0105114 | 4/1984 | European Pat. Off. . | |
| 0273313 | 7/1988 | European Pat. Off. . | |
| 3221318 | 12/1982 | Fed. Rep. of Germany . | |
| WO86/06305 | 11/1986 | PCT Int'l Appl. . | |
| 1597229 | 3/1981 | United Kingdom . | |
| 2117341 | 10/1983 | United Kingdom . | |
| 2143491 | 2/1985 | United Kingdom . | |

Primary Examiner—Kevin P. Shaver
Assistant Examiner—Edward S. Ammeen
Attorney, Agent, or Firm—Edward A. Sager

[57] ABSTRACT

The conveying and off-loading apparatus, used in machines for the automatic selection and distribution of products, comprises a conveyor for transporting individual products from examination stations to discharge stations along a path, including an elongate flexible closed-loop belt and a plurality of rollers distributed on the conveyor. The rollers have axes extending transversely to the longitudinal extension of the conveyor, and adjacent rollers define between one another elongated holders for individual products. Forks rotatably support the rollers on the chain and are adapted to allow small vertical oscillations of the rollers, as the weight of the product and its holder is lifted from the chain and transferred to a level section of the ramp associated with a weighing device at an examination station. The forks are mounted along the chain and oscillate about an axis parallel to the path. The rollers are selectively tiltable for off-loading a product from the conveyor at one of the discharge stations.

13 Claims, 4 Drawing Sheets

U.S. PATENT DOCUMENTS

| | | | |
|---|---|---|---|
| 4,106,628 | 8/1978 | Warkentin et al. | 209/556 |
| 4,139,088 | 2/1979 | Olesen | 198/365 |
| 4,143,751 | 3/1979 | Foster et al. | 198/365 |
| 4,174,773 | 11/1979 | Venzke | 198/365 |
| 4,254,877 | 3/1981 | Rose | 177/145 X |
| 4,262,807 | 4/1981 | Leverett | 209/592 |
| 4,413,690 | 11/1983 | Peterson | 198/504 X |
| 4,426,006 | 1/1984 | Horii et al. | 209/912 X |
| 4,450,073 | 5/1984 | Burnett | 209/593 X |
| 4,461,378 | 7/1984 | Roth | 198/365 |
| 4,482,061 | 11/1984 | Leverett | 209/592 |
| 4,515,275 | 5/1985 | Mills et al. | 209/580 X |
| 4,569,434 | 2/1986 | Horii et al. | 198/365 |
| 4,585,126 | 4/1986 | Paddock et al. | 209/698 X |
| 4,586,613 | 5/1986 | Horii | 198/365 X |
| 4,635,785 | 1/1987 | Prydtz | 198/365 |
| 4,660,665 | 4/1987 | Powell | 209/592 |
| 4,817,744 | 4/1989 | Power, Jr. | 177/145 |

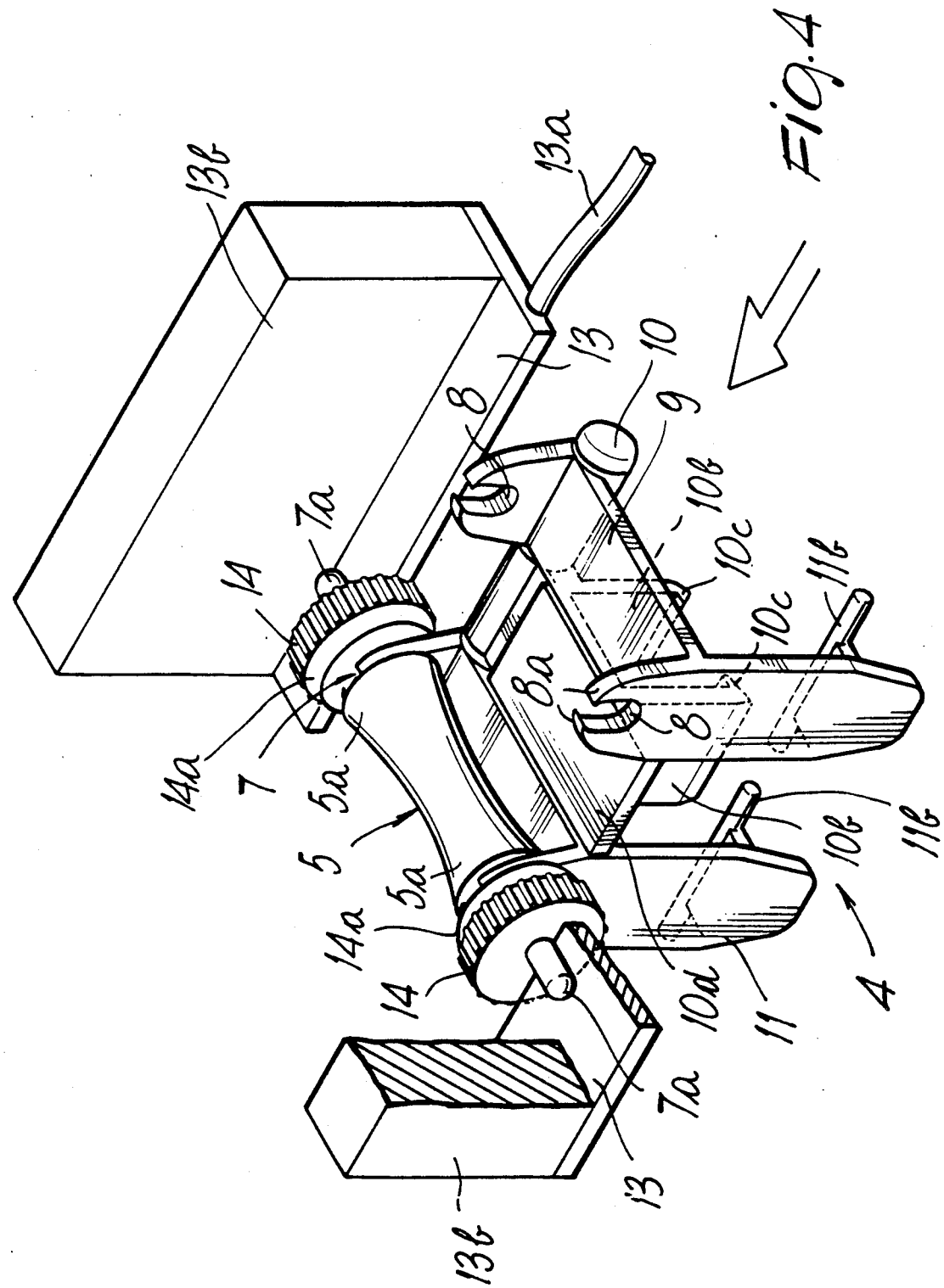

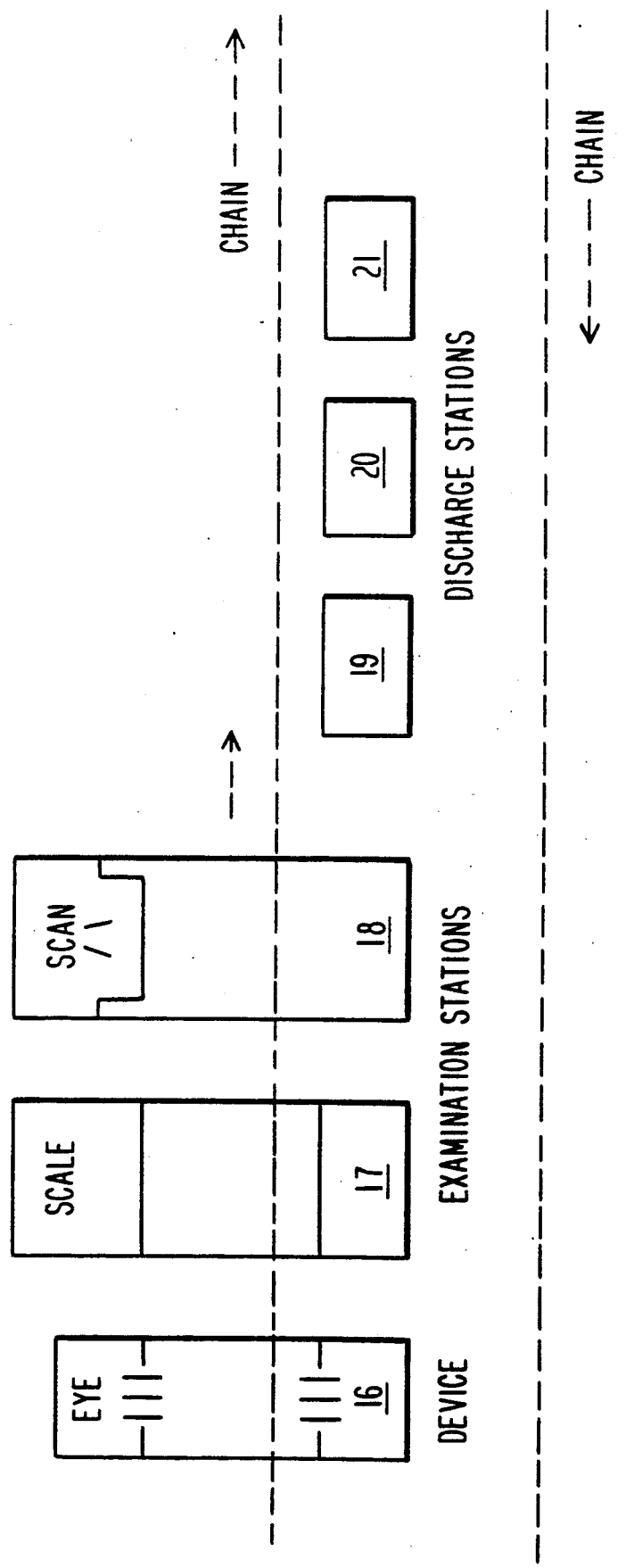

CONVEYING AND OFF-LOADING APPARATUS FOR MACHINES FOR THE AUTOMATIC SELECTION OF AGRICULTURAL PRODUCTS SUCH AS FRUIT

BACKGROUND OF THE INVENTION

The present invention relates to conveying and off-loading an apparatus used in machines for the automatic selection of agricultural products such as fruit.

The apparatus of the present invention is an improvement upon similar apparatus used in automatic sorters for fruit and the like, disclosed for example in the U.S. Pat. No. 4,106,628 to Warkentin et al. filed Aug. 15, 1978, a machine which sorts fruit on the basis of weight and color, and which monitors position, color and weight as the fruit moves from examination stations to discharge stations.

Reference is made to the above mentioned patent for a detailed explanation of sorting machines.

Reference is also made to the U.S. Pat. No. 4,569,434 to Horii et al., to the British Patent Application No. 2,143,491A to A. J. Warkentin, and to the British Patent No. 2,126,356A of Kabushiki Kaisha Maki Seisakusho for additional disclosures of apparata using holders during the transportation of the fruit along a conveyance path, or during examination by one or more detectors.

These patents disclose holders which are tiltable about one side in order to effect the discharge from the holders. However, like the previously cited Warkentin et al. patent, neither do the devices of these other patents permit rotation of the fruit during the examination of the surface, nor mutually combined means for measuring the weight of the fruit while it is loaded on a roller.

SUMMARY OF THE INVENTION

The technical aim of the present invention is to provide a conveying and off-loading apparatus for the automatic selection of agricultural products such as fruit which achieves in the easiest, most effective and rapid manner, the detection of the characteristics of the products.

Within the scope of this aim, a further object of the invention is to provide a conveying and off-loading apparatus which is simple in concept, having a reliable operation and being versatile in use with respect to the various types of product being sorted.

Another aim is to provide such apparatus which facilitates the sorting of fruit with various dimensions without the need for adjustment or replacement of components.

This aim and these objects are achieved by the present apparatus, which is applicable to machines for the automatic sorting and distribution of products and characterized in that it comprises:

a conveyor for transporting individual products along a path comprising an elongated flexible closed loop belt:

a plurality of rollers distributed on said conveyor with their axes extending transversely to the longitudinal extension of the conveyor, and with adjacent rollers defining between one another elongated holders for the individual products:

means which rotatably support said individual rollers on the chain and are adapted to allow up and down movements. i.e., small vertical oscillations of the rollers, said means being mounted along the chain oscillating about an axis parallel to said path.

means for selectively causing the tilting back and forth of said rollers and for holding adjacent rollers simultaneously in tilted position to offload a product from said conveyor.

BRIEF DESCRIPTION OF THE DRAWINGS

The details of the invention will become apparent from the detailed description of an embodiment, given only by way of example, of the apparatus according to the invention, indicatively illustrated in the accompanying drawings, wherein:

FIG. 4 is a partially cutaway and phantom-line perspective view of a weighing station of the apparatus; and FIG. 5 is a diagrammatic illustration of a sorting machine embodying the present invention.

DESCRIPTION OF THE PREFERRED EMBODIMENTS

With reference to the above described figures, 1 generally indicates a sorting path for fruit and vegetable products. Such products are transported along the path 1 by an endless, elongated and flexible chain 2, an element of a conveyor which extends horizontally along an active portion, whereat the chain is conveniently supported by a member 3.

Figure 1:
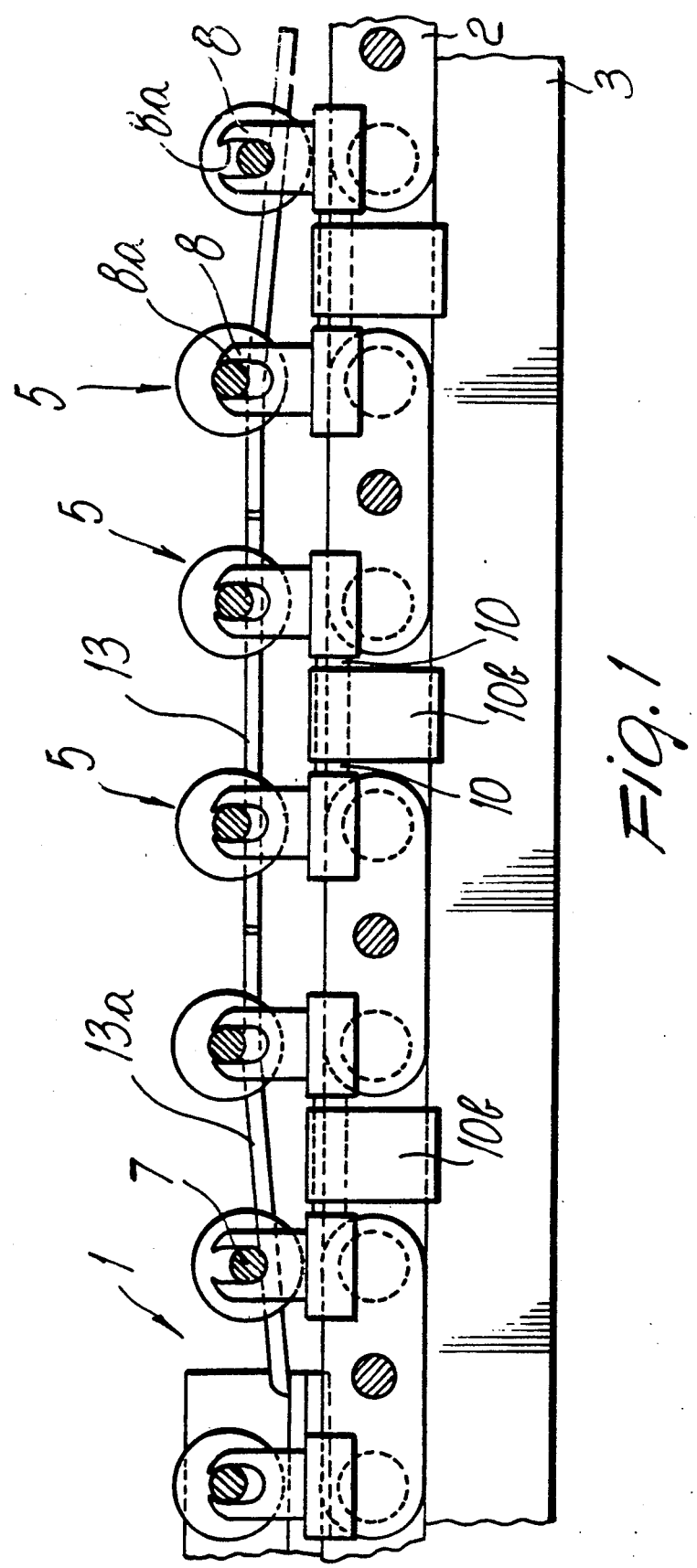
FIG. 1 is a schematic lateral view of the apparatus according to the invention.
Figure 2:
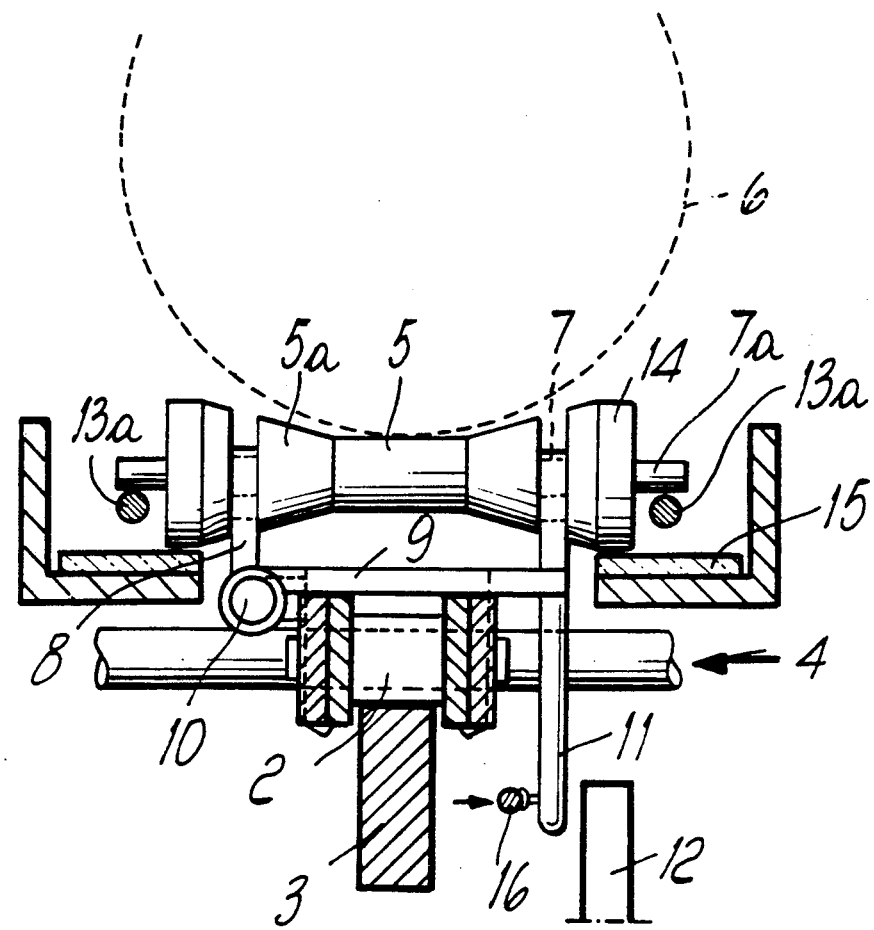
FIG. 2 is a transverse vertical sectional view of the apparatus.

The chain 2 is fitted with evenly and longitudinally distributed support means 4 for a plurality of rollers 5, the axes of which extend horizontally transverse to the chain 2. Between a pair of adjacent rollers 5 serving as a holder, a respective product 6 is intended to be supported and transported, such product being indicated in broken lines (FIG. 2).

For this purpose the rollers 5 each define counterposed portions 5a, substantially in the shape of truncated cones, converging towards the center.

Figure 3:
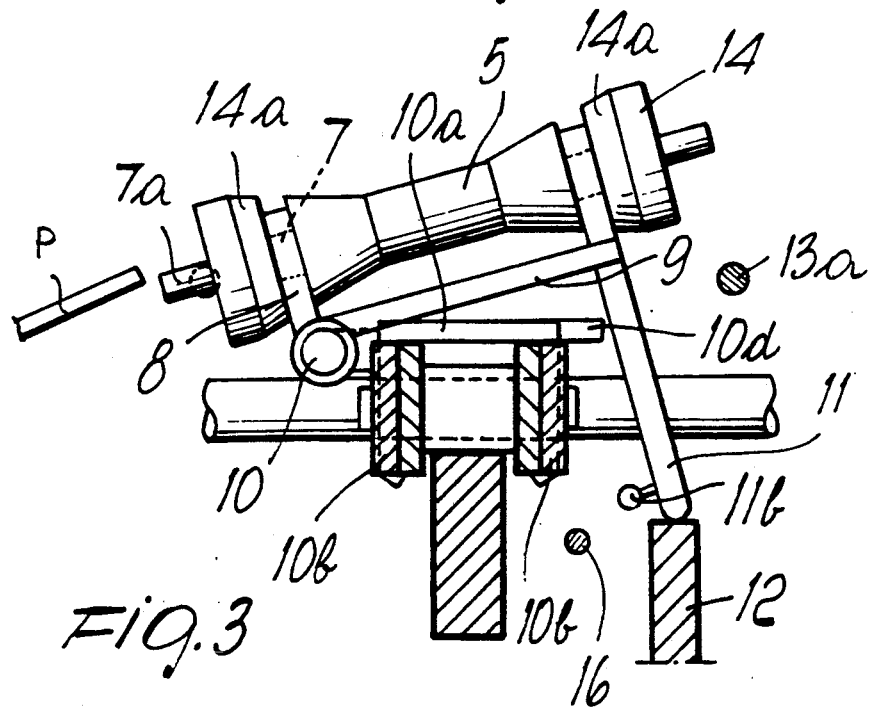
FIG. 3 is a sectional view similar to the preceding one, illustrating the rollers in tilted position.

At or adjacent to the opposite ends, the rollers 5 are axially provided with related shafts or stems 7 by means of which they are made to rest, freely rotatable, on a respective pair of forks or bifurcated elements 8 which constitute part of said support means 4. The forks 8 protrude upwardly from a crosspiece 9 which is laterally tiltable about an axis parallel to the longitudinal extent of the path 1. More in particular, the crosspiece 9 is pivoted, at one end, on a pin or pivot 10 rigidly associated with the chain 2 while at the opposite end it has a flap 11 which, as illustrated in FIG. 3, is adapted to engage a fixed cam 12 adapted for actuating the tilting movement of the crosspiece 9 and its associated roller 5.

In a preferred embodiment, the crosspieces 9 and their respective associated rollers 5 are mounted for tilting motion back and forth about a pivot 10, which is fixed to the side of a cross-member 10a and extends forward for a small area and backwards for a small area with respect thereto.

The cross-member 10a is substantially in the shape of an upturned U, having two sides or side portions 10b, extending downwardly and advantageously having formed at the lower ends thereof, respective protrusions or small end teeth 10c, adapted to engage, in a snap-together manner, with the links of the chain 2. From the side of the cross member 10a opposite to that which bears the pivot 10, the surface of the cross-member extends to define a substantially horizontal protrusion 10d, which acts as stroke limiter for the excursion of the tilting or oscillating movement of the crosspieces and against which engage corresponding abutments constituted by stems 11b, rigidly associated with the flap 11 and expediently protruding in front of and behind the same.

As is clearly visible in the drawing, the shafts 7 of the rollers 5 have a diameter which is smaller than the width of the supporting seat defined by the forks 8, so that it is possible to raise said rollers relative to the forks, conveniently by means of lifting ramps 13a and cams 13 which, are arranged symmetrically and laterally with respect to the path 1, which determine the lifting of the ends 7a of the shafts, are slightly tapered, and support the rollers during weighing. Said forks 8 advantageously define substantially vertical slots and constitute, in a preferred embodiment, means adapted to allow small vertical oscillations of the rollers 5.

This accomplishes the weighing of the products 6, since said cams 13 are the tared part of an appropriate balance: comprising, for example, two load cells 13b supported by uprights fixed to the framework of the machine at an examination station designated 17 in FIG. 5.

It should be observed that the forks 8 have upper ends 8a arranged slightly converging so as to prevent the exit of the shafts of the rollers 5 during the return stroke of the chain 2. The upwardly open slots allow the insertion of the rollers from above, in any case it is not excluded that the slots, at the top, may be closed and in this case the insertion of the shafts 7 in the supports is allowed by slight outward movement, for instance as permitted by elastic deformation, of the top of the supports.

The shafts 7 furthermore have rigidly associated therewith wheels 14, located external to the region of engagement of the forks 8 and downstream of the ends 7a for resting on the cams 13, 13a. The wheels 14 are adapted to engage, in an adapted region of the path 1, driving pads or belts 15, advantageously made of a material having a high coefficient of friction such as rubber, so as to cause by friction, the axial rotation of the related shafts 7 and rollers 5 and consequently that of the conveyed products, though obviously, other kinematic transmission means may also be used for transmitting motion of the belt 15 to the rollers 5. The rotation of the rollers 5 allows scan sensors 18, (not illustrated schematically in FIG. 5) at another examination station to scan the entire surface of the product for assessment of its dimensional characteristics and other similar qualitative parameters.

It is possible to vary the speed of rotation of the products, by positively controlling the translatory motion of the belts 15 with respect to the speed of advancement of the products along the path. In this case it can be provided that the belts be arranged in a closed loop formation and actuated by appropriate power assisted or motor means.

In a preferred embodiment, the rollers 5 and the regions 14a internal of the wheels 14 substantially define a rotational solid form generated by an arc of a circumference which rotates about the axis of the shaft 7 (parallel to the chord of the arc of circumference) and is interrupted by the shafts 7. The circular path of the profile of the rollers, together with the fact that the rollers can be made of soft material such as rubber, causes the load to be better distributed and therefore the resting of the spheroidal surfaces of the fruits to be dampened.

A device 16 for scanning the space between an adjacent pair of rollers may be provided to determine the presence or absence of products, and with means responsive to the presence of an individual product as in FIG. 5 adapted to activate an examination station.

Advantageously the apparatus according to the invention is embodied in a sorting machine provided with means, such as the hard wired circuit components of Warkentin et al or the modern equivalent of the microcomputer, for tracking the position of each individual product 6 transported along said path with relation to said stations, and means producing a signal corresponding to the weight of each individual product measured at said one examination station 17, and for comparing the same with predetermined criteria. in order to discharge said individual product in accordance with such criteria.

Discharge is effected according to such predetermined criteria at a selected one of a series of discharge stations designated 19, 20 and 21 in FIG. 5.

The apparatus may be used in combination with a weighting device comprising a load cell 13b positioned above said ramp 13 and carrying said level section of said ramp.

To summarize, the apparatus described allows to proceed with the on-path sorting of the characteristics of the products 6, employing in the most effective manner conventional measurement instruments and, at the same time, allowing distribution of the sorted products on one or more auxiliary paths P by virtue of the tiltable rollers 5. Said tilting may obviously be controlled differently from what has been previously described, for example by acting on said flap 11 of the rollers 5 by means of cam 12 or appropriate pushers 16 actuated by reciprocating elements, solenoid elements or the like. The present invention differs in many ways from the corresponding apparatus shown in the Warkentin et al. patent, for example the items to be sorted are conveyed on pairs of rollers by holder means which are tiltable to one side of the conveyance path 1 rather than transported by cups.

The most important fact is that weighing is carried out by lifting the holder off the chain and by transmitting the weight thereof to a level section of a lifting ramp connected to and independently supported by a load cell. since there is no need, in weighing, to transfer the individual products 6 to a path of cups, it is no longer necessary, upon variation of the dimensions of the products, to vary the dimensions and the spacing of the holders or rollers 5 along the chain 2: any item can be processed with identical rollers 5 with constant spacing even for products 6 with very different dimensions. It is furthermore possible to use narrow rollers 5, which allow the optical examination of the product even from below.

Since the holder includes a pair of rollers 5, it is also possible to rotate the fruit 6 so as to scan its surface to determine features such as ripeness, blemishes, color, shape or other conditions such as the dimensions of the diameter, the surface area, or other indication of size.

Thus sorting may be carried out on the basis of weight, or of a combination of weight with one or more additional values determined by rotating the fruit and by scanning its surface.

In the practical embodiment of the invention, the materials employed, the shapes and the dimensions may be any according to the requirements.

I claim:

1. Conveying and off-loading apparatus, for machines for the automatic sorting and distribution of products, said machines having examination stations, comprising:
    a conveyor for transporting individual products along a path past said examination stations comprising an elongated flexible closed loop member;
    a plurality of rollers distributed on said conveyor with their axes extending transversely to the longitudinal extension of the conveyor, and with adjacent rollers defining between one another elongated holders for the individual products;
    means which rotatably support said individual rollers for lateral tilting movement on their respective axes on the member for off-loading of product carried thereon, and for allowing small vertical oscillations of the rollers, said means being mounted along the member for tilting movement about an axis parallel to said path;
    means for selectively causing the oscillation of said rollers and for holding adjacent rollers simultaneously in tilted position to off-load a product from said conveyor.

2. Apparatus according to claim 1, wherein said rollers are equally spaced along the length of said flexible member.

3. Apparatus according to claim 2, comprising a device for scanning the space between an adjacent pair of rollers to determine the presence or absence of products, and with means responsive to the presence of an individual product for activating at least one of said examination stations.

4. Apparatus for the automatic sorting and distribution of agricultural products such as fruit, comprising a series of examination and discharge stations for said products along a conveyance path, and a conveyor for transporting a plurality of products to be sorted along said path, said conveyor having holders for the individual products mounted at spaced intervals along an endless, elongated and flexible member, and means for driving said flexible member to continuously advance said holders along said path, wherein each product is discharged at one of a plurality of said discharge stations on the basis of predetermined criteria, means for discharging products on basis of predetermined criteria including an electronic weighing device at one of said examination stations, each of said holders comprising a pair of spaced rollers carried by said flexible member with their axes mutually parallel and transverse to the longitudinal extension of said flexible member, each holder further comprising means for rotatably supporting each roller, said means for supporting including supporting elements having vertically elongated slots receiving respective end portions of the rollers associated therewith, wherein the weight of an individual product is normally carried through a pair of said rollers and the respective supporting means by said flexible member, and a ramp at said one of said examination stations extending parallel towards said path in such a position as to engage each of said holders as it advances towards said one station to lift the end portions of the rollers in said slots to shift the weight of the individual product and of the rollers carrying said product from said flexible member to said ramp, said ramp having a section carried independently by said weighing device so that the weight of the individual product is transmitted to said weighing device at said one of said examination stations.

5. Apparatus according to claim 4, wherein the examination stations include separate stations for examining and for weighing said products and for scanning the surface of said products and wherein said separate stations are operatively associated for sorting said products on the basis of weight and of surface conditions and dimensions.

6. Apparatus according to claim 4, wherein said weighing device includes a load cell positioned above said ramp and carrying said section of said ramp.

7. Apparatus according to claim 4, wherein said supporting elements are bifurcated and open at their top to define a saddle for the support of said rotatable rollers when conveying a product.

8. Apparatus according to claim 5, wherein the separate examination stations for weighing said products and for scanning their surface include a frictional surface extending parallel to said path which engages surface portions of adjacent pairs of rollers advancing through said stations in order to rotate said rollers and the individual products carried thereby, at least one said separate examination stations includes a scanning device for scanning the surface of the individual product to produce a signal corresponding to the condition or dimension of said surface, wherein the individual product is discharged at one of said discharge stations in accordance with the combined criteria of weight and surface condition or dimension.

9. Apparatus according to claim 4, wherein said flexible member comprises a horizontally elongated chain, and wherein the rollers have their axes arranged horizontally and at a right angle to the longitudinal extension of said chain.

10. Apparatus according to claim 4, comprising means for the tilting means for rotatably supporting individual rollers about an axis parallel to said path towards said discharge stations, said means for tilting including cam surfaces, positioned to engage and tilt said holders and to discharge the individual products.

11. Apparatus according to claim 7, wherein said rollers have shaped counterposed portions, substantially in the shape of a truncated cone, converging towards the center and have, at their opposite ends, axial shafts which are supported on a respective pair of said bifurcated elements.

12. Apparatus according to claim 7, wherein said bifurcated elements protrude upwardly from a crosspiece which is laterally tiltable about an axis parallel to that of the path, said crosspiece being pivoted at one end on a pivot rigidly associated with said flexible element and having at the opposite end a flap which engages means for actuating the tilting of the crosspiece.

13. Apparatus according to claim 7, wherein said bifurcated elements have slightly converging ends, so as to prevent the exit of said rollers during the return stroke of said flexible member.

* * * * *